United States Patent
Guo et al.

(10) Patent No.: US 9,600,317 B2
(45) Date of Patent: Mar. 21, 2017

(54) PAGE COMPRESSIBILITY CHECKER

(71) Applicant: VMware, Inc., Palo Alto, CA (US)

(72) Inventors: Fei Guo, San Jose, CA (US); Praveen Yedlapalli, State College, PA (US)

(73) Assignee: VMware, Inc., Palo Alto, CA (US)

( * ) Notice: Subject to any disclaimer, the term of this patent is extended or adjusted under 35 U.S.C. 154(b) by 71 days.

(21) Appl. No.: 14/254,696

(22) Filed: Apr. 16, 2014

(65) Prior Publication Data

US 2015/0301946 A1 Oct. 22, 2015

(51) Int. Cl.
G06F 12/10 (2016.01)
G06F 9/455 (2006.01)

(52) U.S. Cl.
CPC ............ *G06F 9/45558* (2013.01); *G06F 2009/45583* (2013.01)

(58) Field of Classification Search
CPC . G06F 9/45533; G06F 12/023; G06F 12/0246
See application file for complete search history.

(56) References Cited

U.S. PATENT DOCUMENTS

| | | | |
|---|---|---|---|
| 5,696,927 A * | 12/1997 | MacDonald | G06F 12/023 710/68 |
| 6,516,397 B2 | 2/2003 | Roy et al. | |
| 6,564,305 B1 | 5/2003 | Moore | |
| 6,681,305 B1 | 1/2004 | Franke et al. | |
| 7,380,089 B2 | 5/2008 | Herger et al. | |
| 7,844,793 B2 | 11/2010 | Herger et al. | |
| 8,271,450 B2 | 9/2012 | Horovitz et al. | |
| 8,275,909 B1 * | 9/2012 | Rothstein | H03M 7/30 375/240 |
| 2005/0198460 A1 | 9/2005 | Herger et al. | |
| 2011/0238943 A1 * | 9/2011 | Devendran | G06F 12/1009 711/170 |
| 2012/0036325 A1 * | 2/2012 | Mashtizadeh | G06F 12/0802 711/118 |
| 2013/0031292 A1 * | 1/2013 | Van Riel | G06F 12/10 711/6 |
| 2014/0244604 A1 * | 8/2014 | Oltean | H03M 7/30 707/693 |

(Continued)

OTHER PUBLICATIONS

LZ4, Extremely Fast Compression Algorithm, https://code.google.com/p/lz4/, viewed Apr. 16, 2014.

(Continued)

*Primary Examiner* — Ryan Bertram
*Assistant Examiner* — Trang Ta

(57) ABSTRACT

Techniques for checking the compressibility of a memory page that is allocated to a virtual machine (VM) running on a host system are provided. In one embodiment, the host system can determine a compression ratio for the memory page by compressing the memory page using a first compression algorithm. The host system can then compare the compression ratio to a threshold. If the compression ratio does not exceed the threshold, the host system can predict that the memory page is compressible by a second compression algorithm that is distinct from the first compression algorithm. On average, the second compression algorithm can be slower, but achieve a lower compression ratio, than the first compression algorithm.

24 Claims, 6 Drawing Sheets

(56) References Cited

U.S. PATENT DOCUMENTS

| | | | |
|---|---|---|---|
| 2014/0244962 A1* | 8/2014 | Arges | G06F 12/023 711/171 |
| 2014/0281344 A1* | 9/2014 | Shin | G06F 12/02 711/171 |
| 2015/0095919 A1 | 4/2015 | Vincent et al. | |
| 2015/0121111 A1* | 4/2015 | Chun | G06F 1/3275 713/324 |
| 2015/0135173 A1 | 5/2015 | Bacher et al. | |
| 2015/0135175 A1 | 5/2015 | Bacher et al. | |
| 2015/0161055 A1 | 6/2015 | Deguillard et al. | |
| 2015/0178222 A1 | 6/2015 | Hopper et al. | |

OTHER PUBLICATIONS

LZO, Version 2.06, Aug. 12, 2011, http://www.oberhumer.com/opensource/lzo.
Snappy, a fast compressor and decompressor, https://code.google.com/p/snappy/, viewed Apr. 16, 2014.
Swingbench, copyright 2010 Dominic Giles, http://www.dominicgiles.com/swingbench.html.
Zlib, A Massively Spiffy Yet Delicately Unobtrusive Compression Library, zlib 1.2.8, Apr. 28, 2013, http://www.zlib.net.
B. Agrawal et al., "Vmware view planner: Measuring true virtual desktops experience at scale", VMware Tech Journal, Dec. 2012.
Dell DVD Store. http://en.community.dell.com/techcenter/extras/w/wiki/dvd-store.aspx.
Molina et al, "Addressing Memory Exhaustion Failures in Virtual Machines in a Cloud", 2013 IEEE, 6 pages.
Yun et al, "Providing Extra Memory for virtual Machines by Sharing Compressed Swap Pages", 2014 IEEE, pp. 430-431.
Suchithra et al, "Resource Optimization Using Virtual Machine Swapping", 2013 IEEE, pp. 1231-1234.

\* cited by examiner

PAGE COMPRESSIBILITY CHECKER

CROSS REFERENCES TO RELATED APPLICATIONS

The present disclosure is related to commonly assigned U.S. patent application Ser. No. 14/254,725, filed concurrently with the present application, entitled "Content-Based Swap Candidate Selection." The entire contents of this related application are incorporated herein by reference for all purposes.

BACKGROUND

In the field of computer virtualization, a hypervisor is said to be "memory overcommitted" if the total configured guest memory size of all virtual machines (VMs) running on the hypervisor exceeds the physical memory available to the hypervisor from the underlying physical machine (i.e., host system). Most hypervisors in use today support memory overcommitment, as this allows users to achieve higher VM-to-host consolidation ratios and thereby reduce costs and/or improve operational efficiency.

When a virtualized host runs out of free memory, the hypervisor will attempt to reclaim physical memory from running VMs (in units referred to as "pages" or "memory pages") in order to satisfy new memory allocation requests. The hypervisor can implement a number of different techniques for this purpose, such as page sharing, ballooning, and host swapping. Page sharing is an opportunistic technique that attempts to collapse different memory pages with identical content into a single memory page. This can significantly reduce the memory footprint of VMs that operate on identical code/data. Ballooning relies on a guest balloon driver within the guest operating system of each VM. The guest balloon driver pins guest memory that is not actively used, thereby allowing the hypervisor to free memory pages backing the pinned guest memory and re-allocate the freed pages to other VMs.

Host swapping is a memory reclamation technique that involves swapping out memory pages to a file on disk (known as a "host swap file"). Unlike guest swapping, this process is performed entirely at the hypervisor level, and thus is transparent to VMs. When a VM subsequently attempts to access a swapped-out page, the hypervisor swaps the page back into memory from the host swap file. Unfortunately, this swap-in operation incurs a disk access latency that can be as high as several milliseconds, which is orders of magnitude slower than the typical latency for accessing a shared or ballooned page. As a result, host swapping is generally used as a last resort when page sharing, ballooning, and/or other techniques are ineffective in bringing the host system's free physical memory above a critically low level.

To mitigate the high performance penalty of host swapping, some hypervisors leverage a compression technique within its host swapping process (known as "memory compression") that attempts to compress a swap candidate page (i.e., a memory page that has been selected for swapping) before the page is swapped out to disk. If the hypervisor determines that the page is "compressible" (i.e., can be compressed to an output size that satisfies a target compression ratio), the hypervisor saves the compressed page data in a fixed-size block within an in-memory compression cache. The hypervisor then frees the swap candidate page so that it can be re-allocated, without performing any host swapping. On the other hand, if the page is "uncompressible" (i.e., cannot be compressed to an output size that satisfies the target compression ratio), the hypervisor swaps out the page to disk per its normal host swapping process. For the purposes of this disclosure, "compression ratio" is defined as data output (i.e., compressed) size divided by data input (i.e., uncompressed) size, and therefore will be a value between zero and one (with a lower compression ratio indicating more efficient compression).

The amount of physical memory that the hypervisor can reclaim with memory compression depends on the difference in size between memory pages and compression cache blocks. For instance, if the memory page size is 4 KB and the compression cache block size is 2 KB (which means that the target compression ratio is 0.5 or less), the hypervisor will reclaim 4 KB-2 KB=2 KB of space for each compressed page. Thus, memory compression is not as effective at reclaiming physical memory as host swapping. However, the next time a VM attempts to access a compressed page, the hypervisor only needs to decompress the page and fault it into main memory. The latency for this operation is usually around fifty microseconds, which is almost a hundred times faster than disk swap-in latency. Therefore, memory compression can significantly improve VM performance in low memory scenarios where the only alternative is host swapping.

One limitation with memory compression as described above is that the hypervisor does not know whether a given memory page is compressible until it actually attempts to compress the page before swapping it out. This prevents the hypervisor from selecting swap candidate pages in a manner that maximizes successful page compressions and minimizes host swapping. For example, according to a common approach, the hypervisor may select swap candidate pages at random when host swapping is initiated. This may cause the hypervisor to inadvertently select uncompressible pages as swap candidates (resulting in page compression failures and host swapping), even if there are plenty of compressible pages to choose from.

In theory, the hypervisor can overcome this problem by applying the compression algorithm it uses for memory compression as a "checker" to check the compressibility of a memory page before adding the page to its swap candidate list. However, this solution requires that the compression algorithm be relatively fast, since the "checking" operation (which involves compressing the page and comparing the output compression ratio with the target compression ratio) must be performed on a large proportion of memory pages. Some hypervisors currently use the zlib compression algorithm for memory compression, which provides a lower compression ratio than most other compression algorithms (and thus advantageously reduces the likelihood of page compression failures), but is also slower than most other compression algorithms. This means that, in practice, these hypervisors cannot rely on zlib for both memory compression and compressibility checking, because zlib is too slow and/or resource intensive for the latter function.

SUMMARY

Techniques for checking the compressibility of a memory page that is allocated to a VM running on a host system are provided. In one embodiment, the host system can determine a compression ratio for the memory page by compressing the memory page using a first compression algorithm. The host system can then compare the compression ratio to a threshold. If the compression ratio does not exceed the threshold, the host system can predict that the memory page is compressible by a second compression algorithm that is distinct from the first compression algorithm. On average, the second compression algorithm can be slower, but achieve a lower compression ratio, than the first compression algorithm.

The following detailed description and accompanying drawings provide a better understanding of the nature and advantages of particular embodiments.

DETAILED DESCRIPTION

Figure 1:
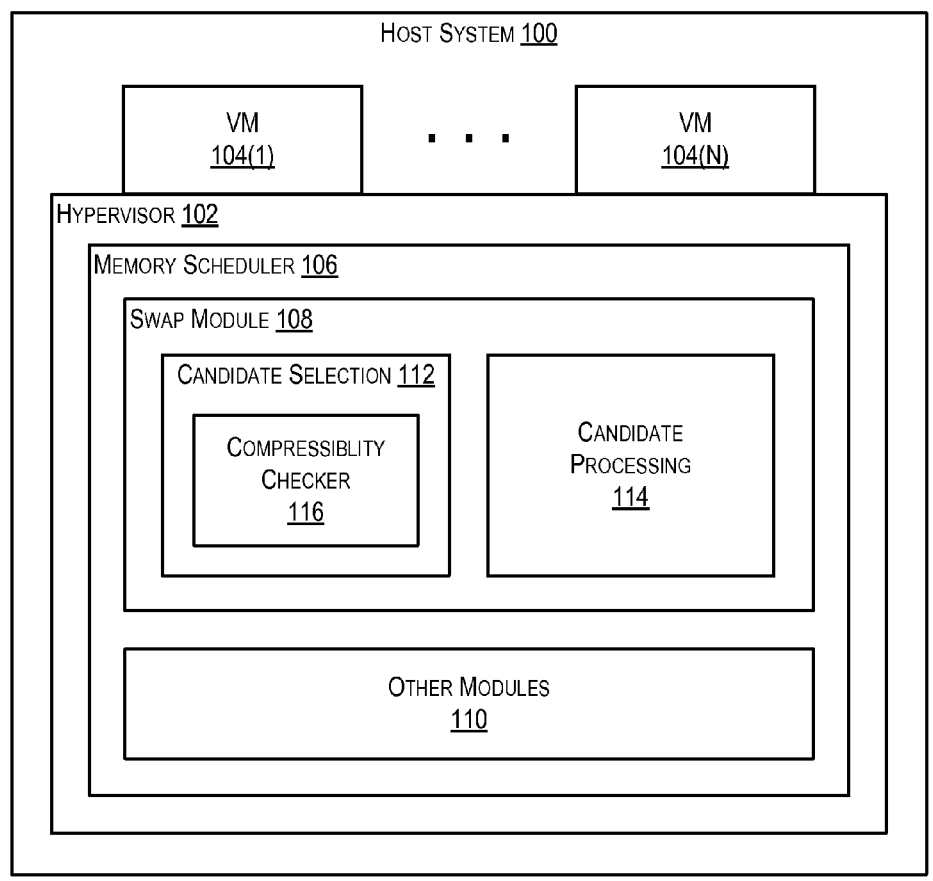
FIG. 1 depicts a host system according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes a compressibility checker that can be implemented within a hypervisor for quickly checking the compressibility of memory pages with respect to a relatively slow, but low compression ratio (LCR), algorithm. The compressibility checker achieves its speed through prediction—in particular, the compressibility checker uses a relatively fast, but high compression ratio, compression algorithm (referred to as the "fast algorithm") as a proxy to predict compressibility with respect to the relatively slow, but LCR, compression algorithm (referred to as the "LCR algorithm"). Thus, the compressibility checker does not need to actually execute the LCR algorithm, thereby speeding up the checking process.

By way of example, in one embodiment, the compressibility checker can determine a compression ratio for a memory page by compressing the page using the fast algorithm. The compressibility checker can then compare the determined compression ratio to a threshold (referred to as the "check threshold"). If the compression ratio does not exceed the check threshold, the compressibility checker can predict that the memory page is compressible by the LCR algorithm.

Among other things, the hypervisor can leverage this compressibility checker to efficiently collect page compressibility information in the context of memory compression/host swapping. Recall that certain hypervisors rely on zlib for memory compression because the low compression ratio achievable by zlib reduces the likelihood of page compression failures (and thus, costly host swapping). However, zlib is also slower than most other compression algorithms, and thus cannot be feasibly used for page compressibility checking With the compressibility checker disclosed herein, the hypervisor does not need to use zlib for both of these functions. Instead, the hypervisor can use a fast, but high compression ratio, compression algorithm (e.g., Snappy) as a proxy for zlib within the compressibility checker. In this way, the hypervisor can perform page compressibility checking with low overhead/high speed in preparation for host swapping. Then, when host swapping is initiated, the hypervisor can use zlib to perform memory compression on the pages that have been predicted to be compressible by the compressibility checker.

In some cases, the compressibility checker may incorrectly predict that a given memory page is compressible by the LCR algorithm (known as a "false positive"), or incorrectly predict that a given memory page is uncompressible by the LCR algorithm (known as a "false negative"). The frequency of these mis-predictions is largely dependent on the check threshold, which may have different optimal values for different VM workloads. To improve prediction accuracy, in certain embodiments the hypervisor can dynamically adjust the check threshold in response to, e.g., feedback from the memory compression process. This dynamic adjustment mechanism is described in further detail below.

I. System Overview

FIG. 1 depicts a host system 100 that supports fast compressibility checking according to an embodiment. As shown, host system 100 executes a virtualization layer (i.e., hypervisor 102) that provides an environment in which one or more VMs 104(1)-104(N) can run. In one embodiment, hypervisor 102 can interact directly with the hardware platform of host system 100 without an intervening host operating system. In this embodiment, hypervisor 102 can include a kernel (not shown) that manages VM use of the various hardware devices of host system 100. In an alternative embodiment, hypervisor 102 can be part of a "hosted" configuration in which hypervisor 102 runs on top of a host operating system (not shown). In this embodiment, hypervisor 102 can rely on the host operating system for physical resource management of hardware devices. One of ordinary skill in the art will recognize various modifications and alternatives for the design and configuration of hypervisor 102.

In the particular embodiment of FIG. 1, hypervisor 102 includes a memory scheduler 106. Generally speaking, memory scheduler 106 is responsible for managing the allocation of host (i.e., physical) memory to/among VMs 104(1)-104(N), which includes reclaiming memory from the VMs in memory overcommitment scenarios. To that end, memory scheduler 106 comprises a swap module 108 (for performing host swapping) and a number of other modules 110 (for performing other memory reclamation techniques, like page sharing, ballooning, etc.). When hypervisor 102 is memory overcommitted, memory scheduler 106 can execute one or more of modules 108/110 (according to a set of rules that is beyond the scope of this disclosure) in order to ensure that host memory is made available to those VMs that actively need it.

In situations where memory scheduler 106 invokes swap module 108 for host swapping, swap module 108 can first build, via a candidate selection component 112, a list of swap candidate pages. This list of swap candidate pages can comprise memory pages that swap module 108 will attempt to swap to disk. Typically, candidate selection component 112 will select the swap candidate pages from the allocated memory space of a particular VM (referred to as a "swap target VM") that memory scheduler 106 has selected as being an appropriate target for host swapping. For instance, in one embodiment, memory scheduler 106 can perform "active memory estimation" to estimate the amount of allocated memory that each VM 104(1)-104(N) is actively using. Memory scheduler 106 can then select the VM that is actively using the smallest percentage of its allocated memory as the swap target VM, since that VM will suffer the least performance degradation if a portion of its memory is swapped out.

Once the swap candidate list is built, swap module 108 can process, via a candidate processing component 114, each swap candidate page in the list in order to carry out host swapping. As part of this processing, candidate processing component 114 can apply memory compression—in other words, candidate processing component 114 can attempt to compress the swap candidate page using a compression algorithm. If the swap candidate page is "uncompressible," meaning that the page's output compression ratio exceeds a predefined target compression ratio, candidate processing component 114 can swap out the page to disk per the standard host swapping flow. On the other hand, if the swap candidate page is "compressible," meaning that the page's output compression ratio meets or is less than the target compression ratio, candidate processing component 114 can save the compressed page data to a block within an in-memory compression cache, without swapping out the page to disk. In this way, candidate processing component 114 can eliminate the disk access latency incurred when swapping the page back into memory at a later point in time, and thus can improve system performance.

As noted in the Background section, one inefficiency with the memory compression technique above is that the compressibility of a given memory page is unknown until candidate processing component 114 attempts to compress the page immediately before swapping it out. If swap module 108 had access to page compressibility information prior to (or at the time of) building the swap candidate list, candidate selection component 112 could preferentially select compressible memory pages as swap candidates and thereby maximize the number of successful page compressions. It is theoretically possible to mitigate this inefficiency by leveraging the compression algorithm used for memory compression as a compressibility checker. However, in practice, LCR algorithms like zlib are preferred for memory compression, which are too slow/resource intensive to be usable for checking purposes.

To address the foregoing problem, hypervisor 102 can include a novel compressibility checker 116 as shown in FIG. 1. Although compressibility checker 116 is depicted as being part of candidate selection component 112 of swap module 108, in alternative embodiments checker 116 can be implemented at any other location within hypervisor 102. As described in Section II below, compressibility checker 116 can accelerate the task of checking page compressibility with respect to an LCR algorithm by relying on a fast algorithm as a predictive proxy. For example, in the context of memory compression/host swapping, the LCR algorithm can be zlib and the fast algorithm can be, e.g., Snappy (or a variant thereof). Since compressibility checker 116 does not actually execute the LCR algorithm within the checking process, swap module 108 can use compressibility checker 116 to optimize its memory compression technique, without suffering from the performance hit that would result from natively employing the LCR algorithm as a checker.

It should be appreciated that host system 100 of FIG. 1 is illustrative and not intended to limit the embodiments herein. For example, the various entities depicted in host system 100 may have other capabilities or include other subcomponents that are not specifically described. One of ordinary skill in the art will recognize many variations, modifications, and alternatives.

II. Checker Implementation

Figure 2:
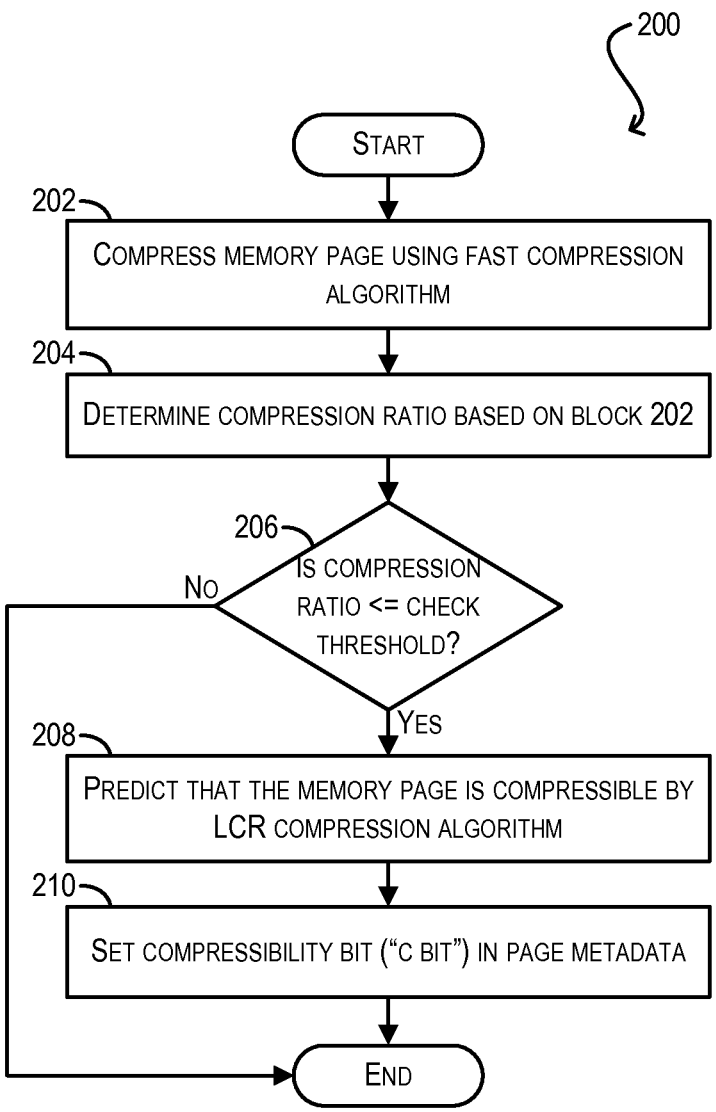
FIG. 2 depicts a flowchart for checking the compressibility of a memory page according to an embodiment.

FIG. 2 is a flowchart 200 of an exemplary implementation of compressibility checker 116 according to an embodiment. Starting with block 202, compressibility checker 116 can compress a memory page using a first compression algorithm (i.e., "fast algorithm"). Compressibility checker 116 can then determine a compression ratio for the memory page based on the output of block 202 (block 204). As indicated previously, the compression ratio can be computed as the output size divided by the input size, yielding a value between zero and one.

If the compression ratio is less than or equal to a check threshold (block 206), compressibility checker 116 can predict that the memory page is compressible by a second compression algorithm (i.e., "LCR algorithm") distinct from the fast algorithm (block 208), where the LCR algorithm is, on average, slower than the fast algorithm, but also can achieve a lower compression ratio than the fast algorithm. In a particular embodiment, the LCR algorithm and the fast algorithm can be based on the same compression principles, so that there is a linear mapping between their average compression ratios. Compressibility checker 116 can then set a compressibility bit (i.e., "c bit") within the metadata of the memory page to record the prediction (block 210) and flowchart 200 can end.

On the other hand, if the compression ratio is greater than the check threshold (block 206), compressibility checker 116 can conclude that the memory page likely will not be compressible by the LCR algorithm. As a result, compressibility checker 116 can proceed directly to the end of flowchart 200, without setting the page's c bit.

With the approach shown in FIG. 2, compressibility checker 116 can determine whether a memory page is compressible by the LCR algorithm in a manner that is significantly faster than simply executing the LCR algorithm itself. It should be noted that "compressible" in this context refers to whether the memory page can be compressed to an output compression ratio that satisfies a target compression ratio. The target compression ratio can vary based on the checker's use case. For instance, if hypervisor 102 uses compressibility checker 116 to determine page compressibility for memory compression, the target compression ratio will depend on the compression factor that is needed to fit a memory page into a compression cache block (e.g., 2:1 compression factor suggests a target compression ratio of 0.5 or less, 4:1 compression factor suggests a target compression ratio of 0.25 or less, and so on). For other use cases, the target compression ratio may depend other criteria/factors.

Generally speaking, in order to leverage compressibility checker 116 for memory compression purposes, hypervisor 102 will need to invoke compressibility checker 116 on a range of memory pages at some point prior to (or at the time of) generating the swap candidate list. This will allow candidate selection component 112 to preferentially select the pages that have been deemed compressible as swap candidates. In one embodiment, memory scheduler 106 of hypervisor 102 can perform this checker invocation in an offline fashion via a group of "scanning" threads. In particular, each scanning thread (one per VM) can run continuously in the background and can invoke compressibility checker 116 on the memory pages allocated to the thread's VM on a periodic basis. With this offline approach, the compressibility information for each page will be readily available (in the form of the c bit) if needed at a later time for swap candidate selection.

In an alternative embodiment, candidate selection component 112 can perform the checker invocation in an online fashion by directly calling compressibility checker 116 when building the swap candidate list. One advantage of this online approach is that compressibility checker 116 will only be executed when needed (i.e., when memory scheduler 106 determines that host swapping should be performed). In the offline approach, compressibility checker 116 will be constantly executed in the background, even if the level of free host memory is sufficient to satisfy all memory allocation requests (meaning that no host swapping is needed).

Figure 3:
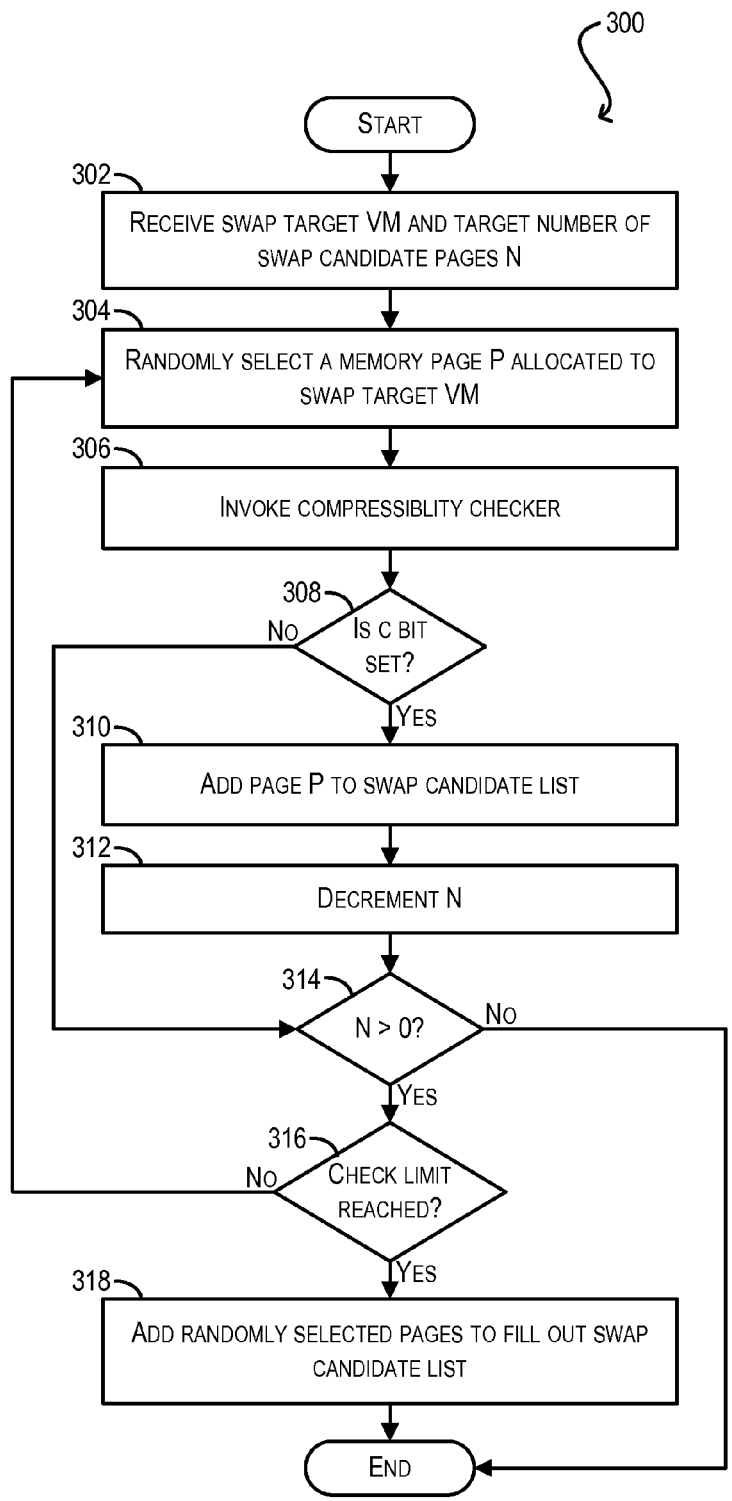
FIG. 3 depicts a flowchart for selecting swap candidate pages according to an embodiment.

To further clarify the online approach, FIG. 3 depicts a flowchart 300 that can be performed by candidate selection component 112 for invoking compressibility checker 116 at the time of building a swap candidate list according to an embodiment. Starting with block 302, candidate selection component 112 can receive the identity of a swap target VM and a target number of swap candidate pages (N) from, e.g., memory scheduler 106. As noted previously, the swap target VM can correspond to the VM that memory scheduler 106 has determined will face the least performance impact from host swapping.

At block 304, candidate selection component 112 can randomly select a memory page (P) from the allocated memory range of the swap target VM. Candidate selection component 112 can then invoke compressibility checker 116 on page P (block 306).

If, after invoking compressibility checker 116, the c bit for page P is set (block 308), candidate selection component 112 knows that page P is likely compressible by the LCR algorithm used during memory compression and thus can add page P to its swap candidate list (block 310). Candidate selection component 112 can then decrement N and check whether N is greater than zero (blocks 312 and 314). If not, candidate selection component 112 can determine that the target number of swap candidates has been reached and flowchart 300 can end.

If the c bit for page P is not set at block 308, candidate selection component 112 knows that page P is likely uncompressible by the LCR algorithm, and thus can proceed directly to checking whether N is greater than zero (block 314). As above, if N is not greater than zero, flowchart 300 can end.

If, at block 314, N is still greater than zero (indicating that the target number of swap candidates has not yet been reached), candidate selection component 112 can check whether a check limit has been reached (block 316). The check limit corresponds to the maximum number of pages that component 112 may check for compressibility during the candidate selection process. Thus, the check limit effectively bounds the amount of time that candidate selection component 112 will spend in order to build the swap candidate list. Without this check limit in place, candidate selection component 112 may need to invoke compressibility checker 116 on an excessively large number of memory pages in order to reach target swap candidate number N, which may degrade the performance of host system 100.

If candidate selection component 112 determines that the check limit has not yet been reached, candidate selection component 112 can return to block 304 to check the compressibility of additional, randomly selected pages. Otherwise, candidate selection component 112 can fill out the rest of the swap candidate list (to target number N) with randomly selected pages (block 318) and flowchart 300 can end. In this latter case, the swap candidate list may include some memory pages that are clearly not compressible by the LCR algorithm. Nevertheless, that potential inefficiency is deemed acceptable in view of the additional time/effort that would been needed to find further compressible pages (beyond the page limit).

It should be noted that flowchart 300 is meant to highlight the online invocation of compressibility checker 116 within the candidate selection process, and is not meant to exhaustively cover the operation of candidate selection component 112. For example, in some hypervisors, candidate selection component 112 may perform additional operations/checks not shown in flowchart 300 when building the swap candidate list, such as checking for page sharing. As another example, in some hypervisors, candidate selection component 112 may use a different page selection method than random selection (e.g., round-robin selection, weighted selection, etc.). One of ordinary skill in the art will recognize many variations, modifications, and alternatives.

III. Dynamic Adjustment of Check Threshold

Since compressibility checker 116 relies on prediction, it may provide an incorrect result on occasion. There are two types of mispredictions that compressibility checker 116 can make: false positives (i.e., predicting that a memory page is compressible when, in fact, it is not) and false negatives (i.e., predicting that a memory page is uncompressible when, in fact, it is). In general, the frequency of these mispredictions largely depends on the value of the check threshold used by the compressibility checker. For example, a check threshold value that is too high will result in a larger number of false positives, while a check threshold value that is too low will result in a larger number of false negatives. Further, the optimal value for the check threshold is not static; rather, it will change based on the content of the memory pages being checked (which, in turn, depends on the workloads of the VMs using those pages).

Figure 4:
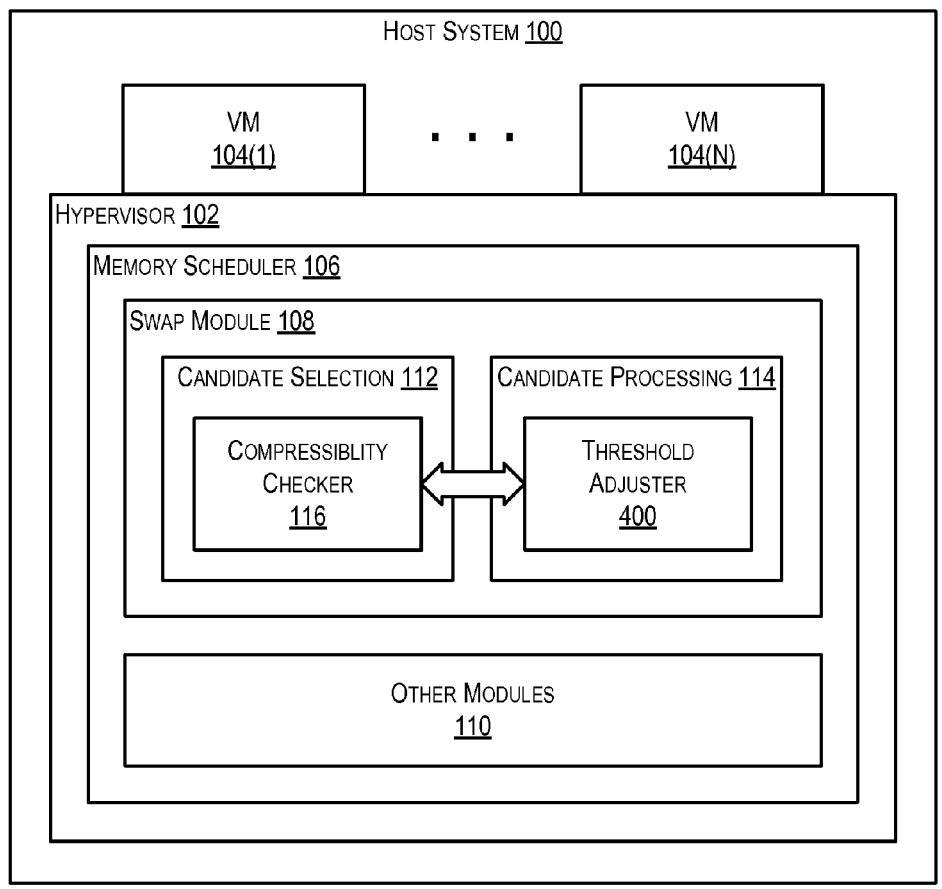
FIG. 4 depicts another host system according to an embodiment.

To improve the prediction accuracy of compressibility checker 116, in certain embodiments hypervisor 102 can include novel threshold adjuster, such as threshold adjuster 400 shown in FIG. 4. Although threshold adjuster 400 is depicted as being part of candidate processing component 114 of swap module 108, in alternative embodiments threshold adjuster 400 can be implemented at any other location within hypervisor 102. At a high level, threshold adjuster 400 can dynamically adjust, at runtime of hypervisor 102, the check threshold used by compressibility checker 116 based on, e.g., feedback from the memory compression process. In this manner, threshold adjuster 400 can take into account the real-time workload characteristics of VMs 104 (1)-104(N) in order to optimize the prediction accuracy of compressibility checker 116.

Figure 5:
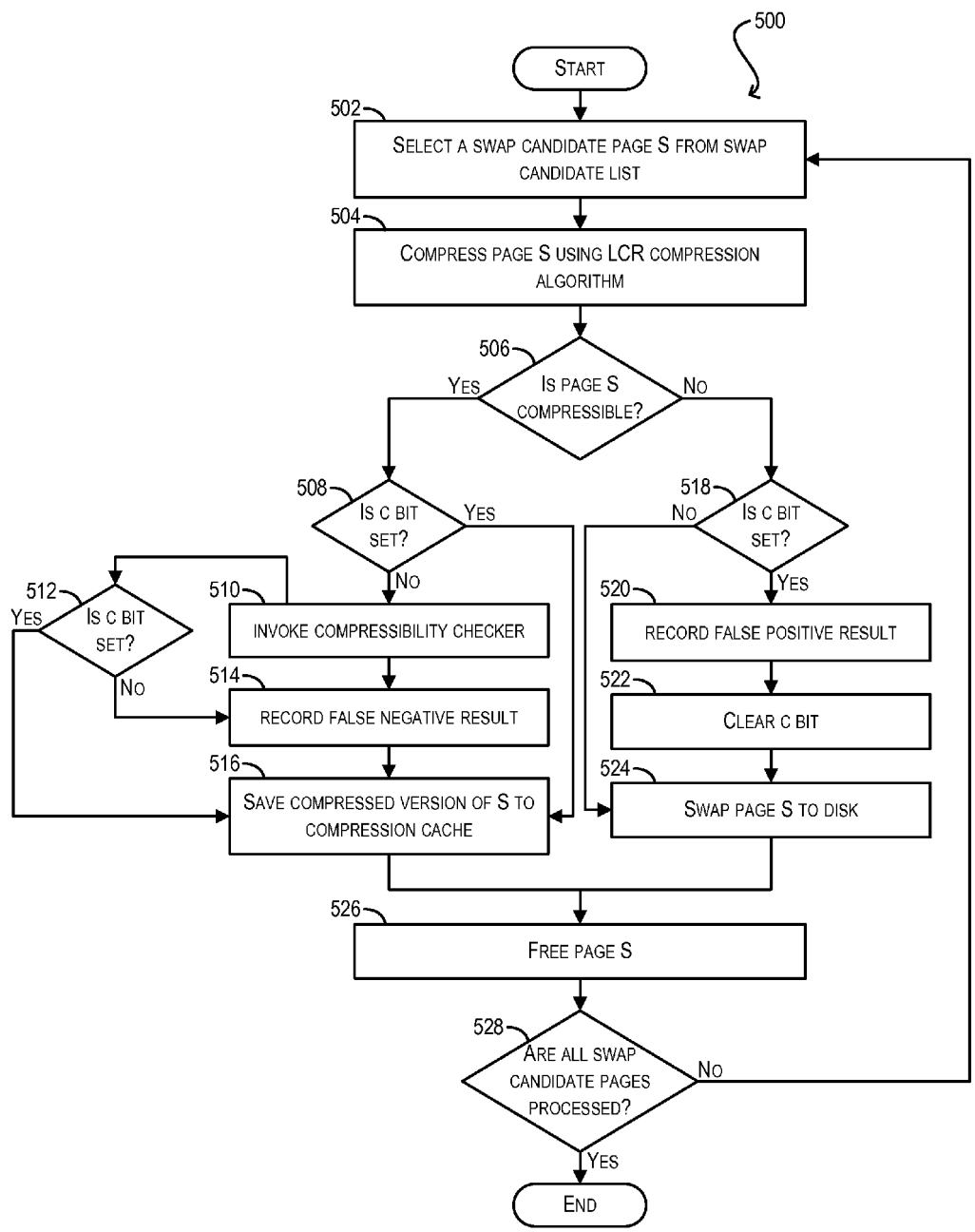
FIG. 5 depicts a flowchart for processing swap candidate pages according to an embodiment.

FIG. 5 depicts a flowchart 500 that can be performed by candidate processing component 114 for collecting false positive/false negative statistics at the time of processing swap candidate pages according to an embodiment. As explained below, threshold adjuster 400 can use these statistics to carry out its dynamic adjustment of the check threshold. Starting with block 502, candidate processing component 114 can select a swap candidate page (S) from the swap candidate list generated by candidate selection component 112. Candidate processing component 114 can then compress page S using its LCR algorithm (e.g., zlib) (block 504) and can check whether page S is compressible (block 506). For example, as part of block 506, candidate processing component 114 can compare the compression ratio achieved at block 504 to the predefined target compression ratio discussed previously.

If page S is compressible at block 506, candidate processing component 114 can proceed down the left-hand flow starting at block 508 and first check whether the c bit of page S is set. If so, candidate processing component 114 can conclude that compressibility checker 116 correctly predicted the compressibility of page S and can save the compressed version of S in the swap target VM's compression cache (block 516).

On the other hand, if the c bit of page S is not set at block 508, candidate processing component 114 can directly invoke compressibility checker 116 on page S (block 510) and can re-check the c bit (block 512). The reason for invoking checker 116 at this point is that the compressibility of page S may never have been checked in the first place (for example, page S may have been added to the swap candidate list as "random filler" per block 318 of FIG. 3).

If the c bit is not set at block 512, candidate processing component 114 can detect that this is a false negative and can record the result (block 514). Candidate processing component 114 can then save the compressed version of S in the swap target VM's compression cache (block 516). Otherwise, candidate processing component 114 can conclude that compressibility checker 116 correctly predicted the compressibility of page S and can proceed directly to block 516.

Returning to decision block 506, if page S is determined to be uncompressible at this block, candidate processing component 114 can proceed down the right-hand flow starting at block 518 and first check whether the c bit of page S is set. If not, candidate processing component 114 can swap the contents of S to disk (block 524).

On the other hand, if the c bit of page S is set at block 518, candidate processing component 114 can detect that this is a false positive and can record the result (block 520). Candidate processing component 114 can then clear the c bit and swap the contents of S to disk (blocks 522 and 524).

At block 526, the left-hand and right-hand flows can merge and candidate processing component 114 can free page S so that it may be re-allocated to another VM. Finally, candidate processing component 114 can check whether all swap candidate pages have been processed (block 528). If not, candidate processing component 114 can return to block 502 to process additional swap candidate pages in the swap candidate list. Otherwise, flowchart 500 can end.

Figure 6:
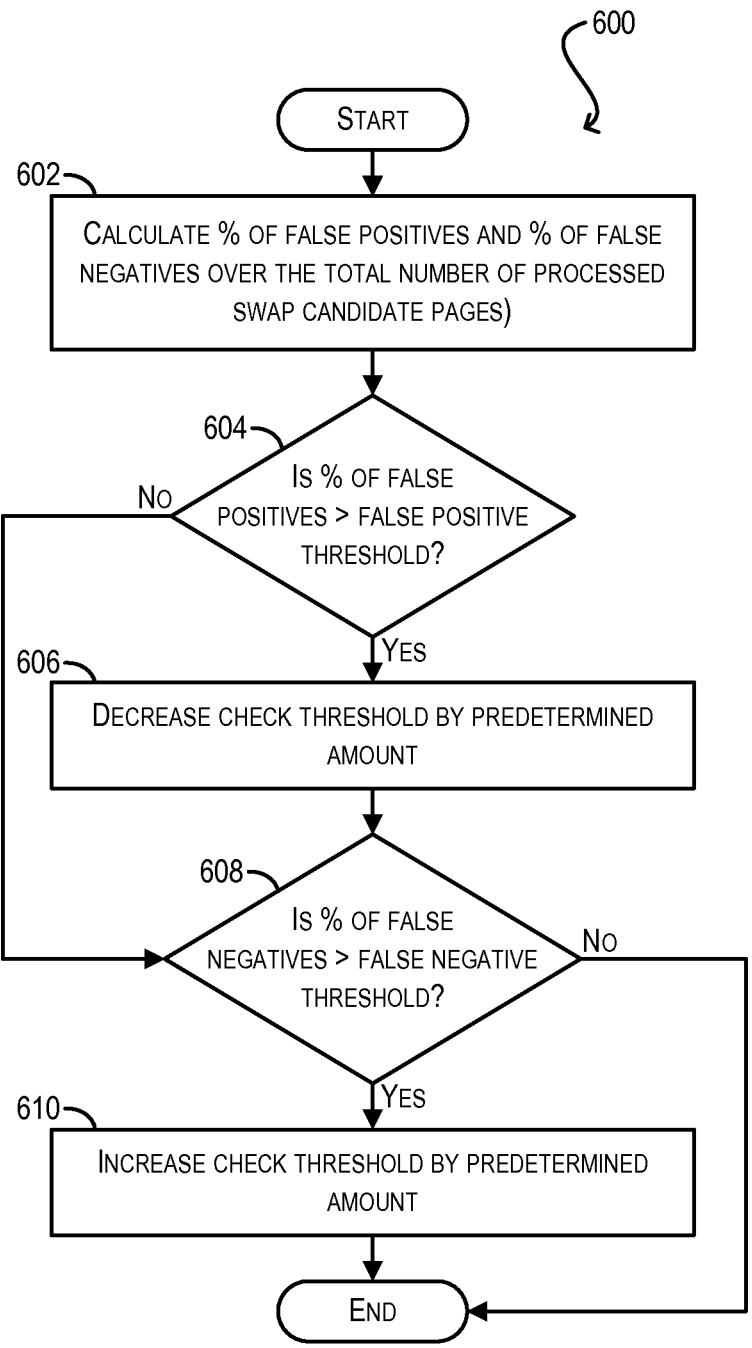
FIG. 6 depicts a flowchart for dynamically adjusting a check threshold according to an embodiment.

FIG. 6 depicts a flowchart 600 that can be performed by threshold adjuster 400 for adjusting the check threshold in view of the statistics collected by candidate processing component 114 in FIG. 5. In one embodiment, threshold adjuster 400 can execute flowchart 600 on a periodic basis, where the execution interval is user-configurable. In another embodiment, threshold adjuster 400 can execute flowchart 600 on-demand (e.g., in response to a request from candidate selection component 112, candidate processing component 114, and/or any other component/module within hypervisor 102).

At block 602, threshold adjuster 400 can calculate, based on the false positive/false negative statistics recorded by candidate processing component 114, a percentage of false positives and a percentage of false negatives over the total number of processed swap candidate pages. Threshold adjuster 400 can then check whether the percentage of false positives exceeds a predetermined false positive threshold (block 604). If the false positive threshold is exceeded, threshold adjuster 400 can decrease the check threshold by a predetermined amount (block 606).

If the false positive threshold is not exceeded, threshold adjuster 400 can subsequently check whether the percentage of false negatives exceeds a predetermined false negative threshold (block 608). If the false negative threshold is exceeded, threshold adjuster 400 can increase the check threshold by a predetermined amount (block 610).

Finally, if the false negative threshold is not exceeded (or the check threshold has been increased per block 610), flowchart 600 can end.

It should be appreciated that the actual values for the false positive and false negative thresholds in flowchart 600, as well as the initial check threshold value, can vary depending on the identity of the two compression algorithms associated with compressibility checker 116. In one embodiment, if the LCR algorithm is zlib and the fast algorithm is Snappy (or a variant thereof), the false positive and false negative thresholds can be set at 4% and the initial check threshold value can be set at 65% (or 0.65). If other compression algorithms are employed, these numbers will likely differ.

Further, although not shown in FIG. 6, in some embodiments threshold adjuster 400 can enforce upper and/or lower bounds on the check threshold when performing its dynamic adjustment process. For instance, in the zlib/Snappy example above, the upper and lower bounds can be 62% (or 0.62) and 68% (or 0.68) respectively. This mechanism can prevent the check threshold from being pushed too low or too high due to, e.g., an atypical VM workload.

IV. Compression Algorithm Optimizations

In the foregoing description, it has been assumed that compressibility checker 116 is fast because the "fast" algorithm that it uses as a predictive proxy for the LCR algorithm has inherently fast compression speed. While this may be true, in certain embodiments the fast algorithm can be further optimized (beyond its standard implementation) to increase the speed of compressibility checker 116.

For example, recall that when compressibility checker 116 executes the fast algorithm on a memory page, checker 116 does not use the actual compressed output of the algorithm; instead, checker 116 only uses the output size in the form of the output compression ratio, which it compares against the check threshold. Accordingly, in one embodiment, the fast algorithm can be modified to remove any code/logic that involves writing compression output to an output buffer. By removing this writing operation, a significant amount of memory bandwidth/CPU time can be saved.

As another example, recall that compressibility checker 116 does not need to know the exact difference between the final output compression ratio achieved by the fast algorithm and the check threshold; checker 116 only needs to know that the fast algorithm can achieve an output compression ratio that meets, or is less than, the check threshold. Accordingly, in another embodiment, the fast algorithm can be modified to track the current output size for an input memory page as its compression process is proceeding, and to monitor the sum of the current output size and the remaining uncompressed data size, divided by the input size. If that value falls below the check threshold at any point, the fast algorithm can immediately abort the compression process because the algorithm knows that the final output compression ratio will also be below the check threshold. This optimization can significantly reduce the response time of compressibility checker 116 for memory pages that are very compression-friendly.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for checking the compressibility of virtual machine (VM) memory pages for facilitating host swapping on a host system, the method comprising:

identifying a swap target VM that a hypervisor of the host system has determined to be a target for host swapping;

determining, by the host system, a target number of swap candidate pages to be swapped to disk from an allocated memory space of the swap target VM;

selecting, by the host system, a memory page at random from the allocated memory space of the swap target VM;

determining, by the host system, a compression ratio for the memory page by compressing the memory page using a first compression algorithm;

comparing, by the host system, the compression ratio to a threshold;

if the compression ratio does not exceed the threshold;
predicting, by the host system, that the memory page is compressible by a second compression algorithm that is distinct from the first compression algorithm, wherein on average the second compression algorithm is slower, but achieves a lower compression ratio, than the first compression algorithm; and
adding the memory page to a list of swap candidate pages for the swap target VM;

determining, by the host system subsequently to adding the memory page to the list of swap candidate pages, whether the target number of swap candidate pages has been reached;

if the target number of swap candidate pages has not been reached, determining, by the host system, whether a maximum number of memory pages that the host system may check for compressibility has been reached; and if the maximum number of memory pages that the host system may check for compressibility has been reached, adding, by the host system, randomly selected memory pages from the allocated memory space of the swap target VM to the list of swap candidate pages until the target number of swap candidate pages is reached.

2. The method of claim 1 wherein the memory page is compressible by the second compression algorithm if the second compression algorithm can achieve a compression ratio for the memory page that is less than or equal to a predetermined target compression ratio.

3. The method of claim 1 wherein, if the host system predicts that the memory page is compressible by the second compression algorithm, the method further comprises:

setting a compressibility bit in metadata for the memory page.

4. The method of claim 3 further comprising dynamically adjusting the threshold during runtime of the host system.

5. The method of claim 4 wherein dynamically adjusting the threshold comprises, at a time of processing the list of swap candidate pages, for each swap candidate page:
   compressing the swap candidate page using the second compression algorithm;
   determining, based on the compressing, whether the swap candidate page is compressible by the second compression algorithm;
   if the swap candidate page is not compressible by the second compression algorithm and the compressibility bit in the swap candidate page is set, detecting a false positive result; and
   if the swap candidate page is compressible by the second compression algorithm and the compressibility bit in the swap candidate page is not set, detecting a false negative result.

6. The method of claim 5 wherein dynamically adjusting the threshold further comprises:
   calculating a percentage of false positive results and a percentage of false negative results;
   if the percentage of false positive results exceeds a false positive threshold, decreasing the threshold by a pre-determined amount; and
   if the percentage of false negative results exceeds a false negative threshold, increasing the threshold by the predetermined amount.

7. The method of claim 1 wherein the first compression algorithm is configured to, at the time of compressing the memory page:
   track compression output size for the memory page, without writing any compression output to an output buffer; and
   abort the compressing before completion if the first compression algorithm determines, based on a current compression output size and a remaining uncompressed data size, that the compression ratio will not exceed the threshold.

8. A non-transitory computer readable storage medium having stored thereon software executable by a host system, the software embodying a method for checking the compressibility of virtual machine (VM) memory pages for facilitating host swapping on the host system, the method comprising:
   identifying a swap target VM that a hypervisor of the host system has determined to be a target for host swapping;
   determining, by the host system, a target number of swap candidate pages to be swapped to disk from an allocated memory space of the swap target VM;
   selecting, by the host system, a memory page at random from the allocated memory space of the swap target VM;
   determining a compression ratio for the memory page by compressing the memory page using a first compression algorithm;
   comparing the compression ratio to a threshold;
   if the compression ratio does not exceed the threshold;
      predicting that the memory page is compressible by a second compression algorithm that is distinct from the first compression algorithm, wherein on average the second compression algorithm is slower, but achieves a lower compression ratio, than the first compression algorithm; and
      adding the memory page to a list of swap candidate pages for the swap target VM;
   determining, subsequently to adding the memory page to the list of swap candidate pages, whether the target number of swap candidate pages has been reached;
   if the target number of swap candidate pages has not been reached, determining whether a maximum number of memory pages that the host system may check for compressibility has been reached; and
   if the maximum number of memory pages that the host system may check for compressibility has been reached, adding randomly selected memory pages from the allocated memory space of the swap target VM to the list of swap candidate pages until the target number of swap candidate pages is reached.

9. The non-transitory computer readable storage medium of claim 8 wherein the memory page is compressible by the second compression algorithm if the second compression algorithm can achieve a compression ratio for the memory page that is less than or equal to a predetermined target compression ratio.

10. The non-transitory computer readable storage medium of claim 8 wherein, if the host system predicts that the memory page is compressible by the second compression algorithm, the method further comprises:
    setting a compressibility bit in metadata for the memory page.

11. The non-transitory computer readable storage medium of claim 10 wherein the method further comprises dynamically adjusting the threshold during runtime of the host system.

12. The non-transitory computer readable storage medium of claim 11 wherein dynamically adjusting the threshold comprises, at a time of processing the list of swap candidate pages, for each swap candidate page:
    compressing the swap candidate page using the second compression algorithm;
    determining, based on the compressing, whether the swap candidate page is compressible by the second compression algorithm;
    if the swap candidate page is not compressible by the second compression algorithm and the compressibility bit in the swap candidate page is set, detecting a false positive result; and
    if the swap candidate page is compressible by the second compression algorithm and the compressibility bit in the swap candidate page is not set, detecting a false negative result.

13. The non-transitory computer readable storage medium of claim 12 wherein dynamically adjusting the threshold further comprises:
    calculating a percentage of false positive results and a percentage of false negative results;
    if the percentage of false positive results exceeds a false positive threshold, decreasing the threshold by a pre-determined amount; and
    if the percentage of false negative results exceeds a false negative threshold, increasing the threshold by the predetermined amount.

14. The non-transitory computer readable storage medium of claim 8 wherein the first compression algorithm is configured to, at the time of compressing the memory page:
    track compression output size for the memory page, without writing any compression output to an output buffer; and
    abort the compressing before completion if the first compression algorithm determines, based on a current compression output size and a remaining uncompressed data size, that the compression ratio will not exceed the threshold.

15. A computer system comprising:
a processor; and
a non-transitory computer readable medium having stored thereon program code that causes the processor to, upon being executed:
identify a swap target VM that a hypervisor of the computer system has determined to be a target for host swapping;
determine a target number of swap candidate pages to be swapped to disk from an allocated memory space of the swap target VM;
select a memory page at random from the allocated memory space of the swap target VM;
determine a compression ratio for the memory page by compressing the memory page using a first compression algorithm;
compare the compression ratio to a threshold;
if the compression ratio does not exceed the threshold:
predict that the memory page is compressible by a second compression algorithm that is distinct from the first compression algorithm, wherein on average the second compression algorithm is slower, but achieves a lower compression ratio, than the first compression algorithm; and
add the memory page to a list of swap candidate pages for the swap target VM;
determine, subsequently to adding the memory page to the list of swap candidate pages, whether the target number of swap candidate pages has been reached;
if the target number of swap candidate pages has not been reached, determine whether a maximum number of memory pages that the host system may check for compressibility has been reached; and
if the maximum number of memory pages that the host system may check for compressibility has been reached, add randomly selected memory pages from the allocated memory space of the swap target VM to the list of swap candidate pages until the target number of swap candidate pages is reached.

16. The computer system of claim 15 wherein the memory page is compressible by the second compression algorithm if the second compression algorithm can achieve a compression ratio for the memory page that is less than or equal to a predetermined target compression ratio.

17. The computer system of claim 15 wherein, if the processor predicts that the memory page is compressible by the second compression algorithm, the program code further causes the processor to:
set a compressibility bit in metadata for the memory page.

18. The computer system of claim 17 wherein the program code further causes the processor to dynamically adjust the threshold during runtime of the computer system.

19. The computer system of claim 18 wherein the program code that causes the processor to dynamically adjust the threshold comprises program code that causes the processor to, at a time of processing the list of swap candidate pages, for each swap candidate page:
compress the swap candidate page using the second compression algorithm;
determine, based on the compressing, whether the swap candidate page is compressible by the second compression algorithm;
if the swap candidate page is not compressible by the second compression algorithm and the compressibility bit in the swap candidate page is set, detect a false positive result; and
if the swap candidate page is compressible by the second compression algorithm and the compressibility bit in the swap candidate page is not set, detect a false negative result.

20. The computer system of claim 19 wherein the program code that causes the processor to dynamically adjust the threshold further comprises program code that causes the processor to:
calculate a percentage of false positive results and a percentage of false negative results;
if the percentage of false positive results exceeds a false positive threshold, decrease the threshold by a predetermined amount; and
if the percentage of false negative results exceeds a false negative threshold, increase the threshold by the predetermined amount.

21. The computer system of claim 15 wherein the first compression algorithm is configured to, at the time of compressing the memory page:
track compression output size for the memory page, without writing any compression output to an output buffer; and
abort the compressing before completion if the first compression algorithm determines, based on a current compression output size and a remaining uncompressed data size, that the compression ratio will not exceed the threshold.

22. The method of claim 2 wherein the predetermined target compression ratio is based on a compression factor that is needed to fit the memory page into a compression cache block used by the hypervisor.

23. The non-transitory computer readable storage medium of claim 9 wherein the predetermined target compression ratio is based on a compression factor that is needed to fit the memory page into a compression cache block used by the hypervisor.

24. The computer system of claim 16 wherein the predetermined target compression ratio is based on a compression factor that is needed to fit the memory page into a compression cache block used by the hypervisor.

* * * * *